UNITED STATES PATENT OFFICE.

CHARLES L. FLEISCHMANN, OF WASHINGTON, DISTRICT OF COLUMBIA.

TREATMENT OF PRAIRIE SOIL TO OBTAIN USEFUL PRODUCTS THEREFROM.

SPECIFICATION forming part of Letters Patent No. 258,737, dated May 30, 1882.

Application filed March 29, 1882. (No specimens.)

*To all whom it may concern:*

Be it known that I, CHARLES LOUIS FLEISCHMANN, of the city of Washington, in the District of Columbia, have invented a new and useful Improvement in Methods for Treating Prairie and other Soils for Obtaining Valuable Industrial Products therefrom; and I do hereby declare that the following is a full, clear, and exact description of the invention, which will enable others skilled in the art to which it appertains to make use of the same.

Pure vegetable mold, like the prairie soil of the Northwestern States and the glades of some parts of this country, is composed of all the substances necessary for the full development of all agricultural plants, containing the inorganic as well as all organic substances in large quantities; yet these substances have never been extracted from that soil for any technical purposes.

The object of my invention is to extract from the prairie soil or any vegetable mold the most important organic or inorganic substances for various industrial purposes.

The vegetable mold of the prairies and glades is formed of decayed grass and herbaceous plants, with little admixture of earthy substances. Since thousands of years it has accumulated, and forms in many places a deposit of several feet in depth. No doubt the deep prairies have been once shallow lakes, in which aquatic plants—such as the *Nymphæa*—gradually covered those lakes and deposited their débris at the bottom. In course of time, as the rivers which cross that region cut deeper channels they drained gradually the lakes, and upon the débris of the aquatic plants grew sour grasses, and later the better kind of grasses, which left every year an addition of their débris, and after thousands of years it formed that extraordinary deposit which has not its equal in the world as to extent and depth.

When we compare the analysis of aquatic plants with that of the grasses and herbaceous plants, we find in all the organic and inorganic substances necessary for the growth of plants. They differ as to the quantities, but all are rich in potash and organic substances. It is not peat, but a soil of *sui generis.*

The object of my invention is to extract from the prairie soil or glades the potash, the carbon, and its nitrogen. To obtain from those soils the potash, it is necessary to submit it first to the flame of a coal-fire, in order to burn out the carbon in the vegetable mold and to drive from it the nitrogen contained in it. For that purpose I use a furnace with a wide hearth of the same construction as formerly used in the manufacture of lamp-black. The vegetable mold is placed behind the fire, so that the flame ignites the vegetable mold, and the gases arising from it are carried along with the sulphurous smoke or acid formed from the stone-coals into the cooling-chambers, where the particles of fine carbon of the vegetable mold are deposited in connection with the sulphate of ammonia, formed by the union of the sulphur vapors with the ammonia which has been formed during its passage into the cooling-chamber of the furnace.

The soot or fine carbon, as above stated, in its raw state can be used for manure. It is considered almost equal to guano, as it contains in one hundred pounds of soot six per cent. of sulphate of ammonia and other fertilizing substances. When all the volatile substances are expelled from the vegetable mold, when its color has changed from black to a light gray, the ashes of the mold can be withdrawn from the furnace, and are, while hot, sprinkled over with cold water to loosen the silicates and alkaline salts. When the ashes are perfectly cool they are mixed with slaked lime, in order to render the silicates still more soluble, and left for some time in large heaps, which are kept moist, before they undergo lixiviation. The sulphate of ammonia is obtained by using stone-coal in reducing the vegetable mold to ashes. The sulphurous and nitrogenous vapors arising from the stone-coal form a chemical combination with the nitrogenous vapors of the vegetable mold and form sulphate of ammonia, which are carried by the heated current in the cooling-chamber, where they are deposited with the vapors, rich in carbon, and each one of those delicate particles is impregnated with the sulphate of ammonia. The lixiviation and concentration of the potash does not differ from the method used in soap-boiling establishments.

By this process I obtain from one cubic foot of prairie soil from six to fifteen per cent. of chiefly carbonate of potash, and from one hundred pounds of that soil three to five per cent. of soot. One hundred pounds of soot, when submitted to the process of dry distillation, yield six per cent. of sulphate of ammonia, besides some tar and about fifty per cent. of purified lamp-black.

Having fully described my invention, what I desire to claim and to secure by Letters Patent is—

The herein-described method of extracting the alkaline, carbonaceous, and nitrogenous matters existing in or derivable from the vegetable mold of prairies or other rich soils, by exposing such soils to the heat of combustion and sublimation, and subsequently treating the products thus obtained by purification and lixiviation, as set forth.

CH. L. FLEISCHMANN.

Witnesses:
PARKER W. PAGE,
JOHN J. BEATTY.